United States Patent [19]

Tremblay et al.

[11] Patent Number: 5,722,346
[45] Date of Patent: Mar. 3, 1998

[54] SMOLTING FEED

[75] Inventors: George C. Tremblay, Carolina, R.I.; Terence M. Bradley, Northbridge, Mass.; Hong Ji, Philadelphia, Pa.

[73] Assignees: The Board of Governors for Higher Education; Providence Plantations, both of Providence, R.I.

[21] Appl. No.: 633,506

[22] Filed: Apr. 17, 1996

[51] Int. Cl.⁶ ............................ A01K 61/00; A23K 1/18; A61K 31/205
[52] U.S. Cl. ............................................. 119/230; 119/217
[58] Field of Search ........................... 119/230, 217, 119/231; 426/2, 805, 69; 424/442

[56] References Cited

U.S. PATENT DOCUMENTS

| | | |
|---|---|---|
| 3,777,709 | 12/1973 | Anderson et al. |
| 4,385,589 | 5/1983 | Knowles et al. |
| 4,509,458 | 4/1985 | Rines et al. |
| 4,960,795 | 10/1990 | Salte et al. |
| 5,030,657 | 7/1991 | Burtle et al. |
| 5,401,727 | 3/1995 | Rorstad et al. |

FOREIGN PATENT DOCUMENTS 55-24343  2/1980  Japan.

OTHER PUBLICATIONS

Carnitine Adminstration to Sea Bass (Dicentrarchus labrax (L.)) during Feeding on a Fat Diet: Modifcation of Plasma Lipid Levels and Lipoprotein Pattern, Aquaculture, 68, 1988, 345-351.

The Effects of Carnitine on the Growth of Sea Bass, Dicentrarchus labrax L., fry, J. Fish Biol., 1986, 28, 81-86.

Effects of Dietary Carbohydrate-to-Lipid Ratios on Growth and Body Composition of Fingerling Channel Catfish, The Progressive Fish-Culturist, vol. 39, No. 1, Jan. 1977, 43-47.

Chemical Abstracts, Effects of Supplemental Dietary Carnitine on Growth and Lipid Metabolism of Hatchery-Reared Sea Bass (Dicentrarchus labrax L.); 195128: vol. 106, 1987.

Characterization and Tissue Distribution of Pyruvate Carboxylase in Atlantic Salmon (Salmo Sara), Comp. Biochem. Physiol., vol. 106B, No. 3, 1993, 587-593.

*Primary Examiner*—Gene Mancene
*Assistant Examiner*—Yonne R. Abbott
*Attorney, Agent, or Firm*—Samuels, Gauthier, Stevens & Reppert

[57] ABSTRACT

A fish feed composition to reduce mortality and/or improve growth in juvenile salmon upon transfer to seawater. The fish feed includes L-carnitine in admixture with juvenile salmon feed compositions sufficient to improve gluconeogenesis and/or glycogen reserves during smoltification and adaption to seawater.

15 Claims, 3 Drawing Sheets

SMOLTING FEED

This invention was supported by a grant (90-34123-5139) from the United States Department of Agriculture.

FIELD OF THE INVENTION

The invention relates to the effects of L-carnitine on the growth, metabolism and body composition of juvenile Atlantic salmon (*Salmo salar*) during smoltification.

BACKGROUND AND BRIEF SUMMARY OF THE INVENTION

Sea-type salmon such as Atlantic salmon (*Salmo salar*) and coho salmon (*Oncorhynchus kisutch*) return from salt water to fresh water rivers to spawn, thereby generating fresh water fry. Within generally a two-year period or so, the salmon pass through the parr development stage and become smolt, in which state they can return to the sea for salt water maturation. The time period during which the fish remain smoltified is, however, quite limited, usually just several weeks for the Atlantic salmon.

When this process is simulated in hatcheries, the same limited period of smoltification exists. If the smolts are not seasonably introduced to sea water they revert back to parr characteristics, unsuited for salt water survival and growth. In nature, another year of freshwater life as parr is required before smolting again occurs. However, in the hatchery operation, they do not have occasion to revert back to parr and in the seawater they either die or their growth is stunted.

Outward manifestations of the conversions from the parr to the smolt are the loss of parr markings (black bars on the lateral surface), the turning silver of the skin, the osmotic adaptations of gills and kidneys, and the stretching or lengthening and thinning of the fish into a streamlined form with pointed heads and tails. For a limited time, in smoltified condition, the fresh-water-grown fish is ready for the stress and shock of introduction into salt water and subsequent life therein. If introduction is delayed the fish reverts back to its parr characteristics, regaining spots or stripes, losing the silver and becoming dull or lead-color and darker, losing scales, losing the streamlining, and fattening out with rounding of its head and tail.

The harvesting of salmon via aquaculture is currently practiced and various methods have been described, see for example, U.S. Pat. No. 3,777,709, 4,385,589 and 4,509,458. When smolts are transferred to seawater or seawater pens there is often a low survival rate, usually owing to the transfer outside of the narrow window of peak smoltification.

In contrast to mammals, fish have the unusual ability to maintain liver glycogen (animal starch). An exception to this is salmon during smoltification. During smoltification, energy metabolism is accelerated and liver glycogen is virtually depleted, despite heavy feeding. Smaller molecules, such as lactate (produced from muscle contraction) and amino acids (generated by digestion of a high protein diet) are reassembled to create sugar and glycogen (starch). This enzymatic sequence of about a dozen reactions is called gluconeogenesis. As with other carnivores, salmon are largely dependent upon gluconeogenesis to provide blood sugar (glucose) and glycogen stores.

Glycogen in liver and muscle is an important source of energy, as is blood sugar. There are some published reports on changes in blood sugar with smoltification but these reports are contradictory. In recent studies, seasonal changes in liver glycogen in juvenile Atlantic salmon were measured and it was found the amount declined steadily from January to a minimum value at or near peak smoltification in April/May (unpublished results, FIG. 1). A key regulatory enzyme controlling gluconeogenesis is pyruvate carboxylase (PC). Season changes in PC activity followed closely seasonal changes in liver glycogen (unpublished results, FIG. 2). Accordingly, work was undertaken to determine whether impaired gluconeogenesis might be responsible for the reduced levels of blood glucose and liver glycogen observed during smoltification. Since lactate is a superior gluconeogenic substrate in Atlantic salmon, lactate was used as the gluconeogenic precursor in the measurements. Since PC is widely viewed as the rate-controlling enzyme in lactate-dependent gluconeogenesis, PC activity was assayed in the same samples of liver. Reduced blood sugar and depletion of liver glycogen during smoltification was found to be associated with a 43–54% reduction in the capacity of the liver for lactate-dependent gluconeogenesis. In addition, reduced capacity for gluconeogenesis, was found to be associated with a 64–75% decline in PC activity (unpublished results, Table I).

TABLE 1

Biochemical measurements in parr and smolts

| Measure | Parr | Smolt | Post smolt |
|---|---|---|---|
| Gill $Na^+/K^+$-ATPase | $6.8 \pm 1.0$ | $41.1 \pm 6.5*$ | $10.0 \pm 3.2\dagger$ |
| (µmol Pi/mg protein/hr) | (Jan.; n = 4) | (n = 4) | (n = 4) |
| Plasma glucose | $2.0 \pm 0.3$ | — | $1.04 \pm 0.16*$ |
| (mg/ml) | (age-matched; n = 6) | | (n = 6) |
| Liverglycogen | $95.3 \pm 26.8$ | — | $31.2 \pm 16.4*$ |
| (mg/g liver) | (Jan.; n = 6) | | (n = 6) |
| Pyruvate carboxylase activity | $67.8 \pm 44$ | $16.7 \pm 4.5*$ | $24.5 \pm 4.7*\dagger$ |
| (nmol product/mg protein/min) | (Jan.; n = 6) | (n = 6) | (n = 6) |
| | $90.5 \pm 4.7$ | | |
| | (age-matched; n = 6) | | |
| Lactate-dependent gluconeogenesis | $3.98 \pm 0.54$ | $2.26 \pm 0.44*$ | $1.83 \pm 0.31*\dagger$ |
| (µmol/g liver/hr) | (Jan.; n = 4) | (n = 6) | (n = 3) |
| | $3.45 \pm 0.62$ | | |
| | (age-matched; n = 3) | | |

*Values are different from the corresponding value shown for parr ($P < 0.05$).
†Values are different from the corresponding value shown for smolts ($P < 0.05$).

In the above experiments, parr were assayed 3–4 months before smoltification, or age-matched cohorts that failed to undergo smoltification. Values shown are means ±SD (number of samples assayed). Glucose and glycogen were assayed by enzymatic methods. Oubain-sensitive release of Pi from ATP by homogenates of gill filaments in detergent provided values for $Na^+/K^+$-ATPase. Pyruvate-dependent oxidation of NADH by mitochondrial lysates incubated with excess malate dehydrogenase and substrates for both enzymes gave values for pyruvate carboxylase activity. Incorporation of radiolabeled lactate into glucose by suspensions of liver cubes provided the measure of gluconeogenesis.

The invention generally relates to diet supplements, particularly those including carnitine, for juvenile salmon for preventing blood sugar and liver glycogen depletion during smoltification. The use of a carnitine feed supplement for preventing stress in catfish grown via aquaculture is described in U.S. Pat. No. 5,030,657. The use of L-carnitine as a diet supplement for fish and shellfish is also known to enhance the health of the fish and/or increase resistance to pathogens, see Japanese Application 55-24343, Feb. 27, 1989 and U.S. Pat. Nos. 4,960,795; 5,401,797; and Santulli, A. and D'Amelio, V. D., *The Effects of Carnitine on the Growth of Sea Bass*, J. Fish Biol., 28:81–86, 1986; Santulli, A.; Madica, A.; Curatolo, A.; and D'Amelio, V. D.; *Carnitine Administration to Sea Bass, Aquaculture*, 68:345–351, 1989. However, the ability of carnitine to enhance gluconeogenesis has not been described.

It has been observed that smolt liver exhibits about half the gluconeogenic capacity of that exhibited by parr liver and concluded that reduced levels of blood glucose and liver glycogen during smoltification may reflect impaired gluconeogenesis.

To determine why gluconeogenesis might be impaired in smolts, the activity of the primary regulatory enzyme in the gluconeogenic pathway (pyruvate carboxylase, or PC) was measured and found to be reduced some 75% during smoltification. This determination suggested that genetic expression of PC is suppressed and that if the activity of PC could be increased, capacity for gluconeogenesis might be restored and the blood glucose and liver glycogen increased.

It has now been discovered that parr fed a diet supplemented with carnitine exhibit more than triple the PC activity observed in parr fed carnitine-free diet. This increased PC activity was associated with more than a doubling in the capacity for gluconeogenesis and a 5.4× rise in muscle glycogen. If prevention of the reduction in gluconeogenesis and resultant loss of liver glycogen and blood glucose can similarly be achieved in smolts, the increase in energy reserves could improve the yield, i.e., greater survival and/or growth of the smolt upon transfer to seawater.

DETAILED DESCRIPTION OF THE INVENTION

Figure 1:
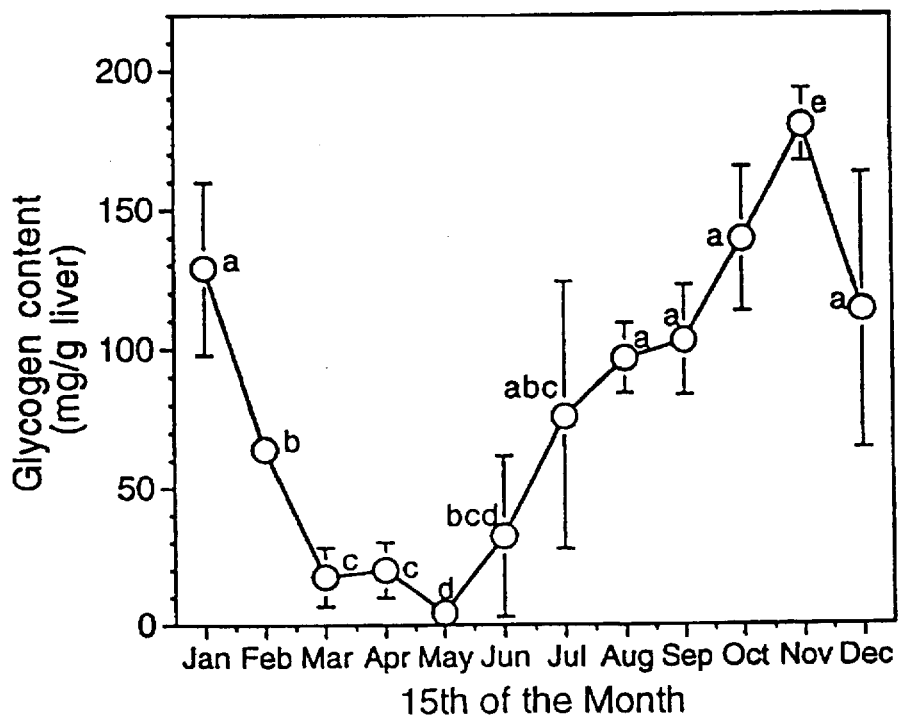
FIG. 1 is a line graph showing the changes in glycogen content in the liver over a season for juvenile Atlantic salmon.
Figure 2:
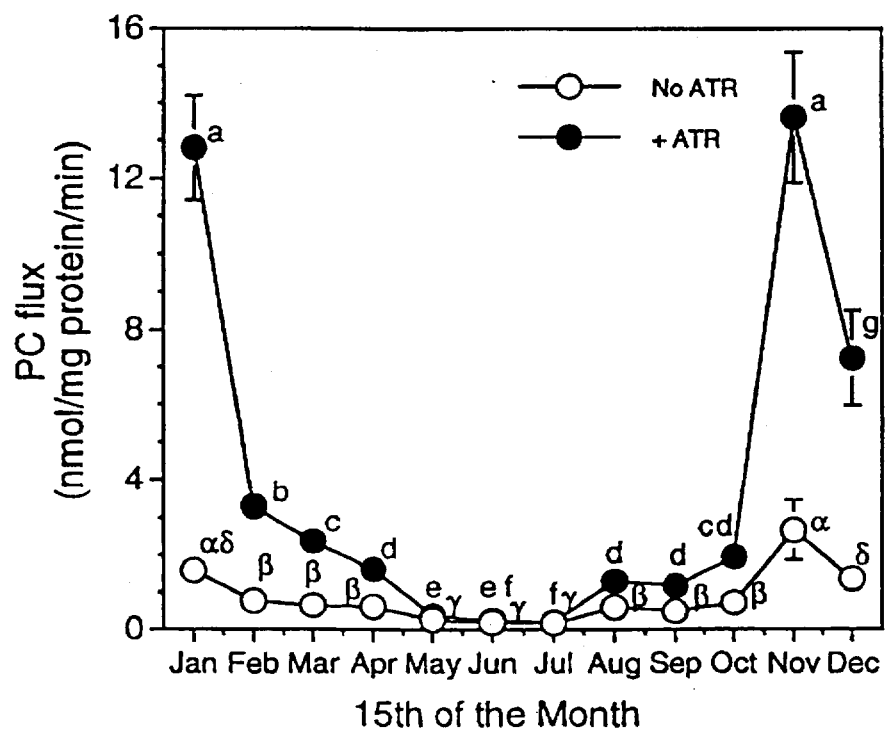
FIG. 2 is a line graph showing the change in PC flux over the season in juvenile Atlantic salmon.

The suggestion that dietary carnitine might improve the capacity for fatty acid oxidation was supported by evidence that palmitate oxidation by salmon mitochondria is carnitine-dependent, and that hepatocytes isolated from carnitine-fed salmon oxidized palmitate at a rate 2.5× greater than hepatocytes from carnitine-deprived salmon (see Table 3 below).

The suggestion that increased fatty acid oxidation may stimulate PC flux was supported by evidence showing an 81% increase in PC flux in mitochondria isolated from carnitine-fed fish. Assays of particle-free extracts revealed mitochondria from carnitine-fed fish to contain from 3.3× more PC, suggesting enzyme induction, or reduction in enzyme turnover, in the mechanism.

The suggestion that increased PC flux might stimulate lactate-dependent gluconeogenesis was supported by evidence obtained in assays with liver cubes and isolated hepatocytes. Results showed a 120% to 210% increase in the incorporation of lactate into glucose in liver from carnitine-fed fish.

Based on the foregoing findings, additional data, which follows was gathered. Based on the following data, one skilled in the art can reasonably conclude that feeding juvenile salmon a diet supplemented with carnitine during the smoltification process will increase the yield of the salmon by reducing mortality and/or improving the growth of the juvenile salmon upon transfer to seawater.

Materials and Methods

Preparation of diets. The composition of the carnitine-free (control) diet is shown in Table 2. Dry ingredients except gelatin were mixed by triturating equal amounts in ascending order, by geometric progression, with a mortar and pestle. The dry mixture was then mixed with fortified oil and choline-Vitamin $B_{12}$ solution using a KitchenAid Mixer Model K5SS (KitchenAid Inc., St. Joseph, Mich.). In a separate beaker, gelatin was added to 259 mL water and dissolved with stirring while heating to 85° C. in a water bath. Where indicated, L-carnitine, Sigma Chemical Co., St. Louis, Mo. (Product No. C0158), was added in place of an equal weight of sucrose by dissolving the carnitine in a small aliquot of the water used to prepare the gelatin solution. The hot suspension of gelatin was immediately blended into the other ingredients in the mixer. After cooling for 10 minutes, the warm diets were extruded through a thin spaghetti extrusion plate (KitchenAid, Model SN/FGA). The strands of diets were cooled, broken into small pellets with the mixer, and stored at $-20°$ C. until use (within 8 weeks).

Animals and feeding. Atlantic salmon fry (Penobscot-strain) obtained from the North Attleboro National Fish Hatchery, North Attleboro, Mass., were reared at the East Farm Aquaculture Center of the University of Rhode Island. They were fed a commercial fish feed (Nelson's Sterling Silver Cup, Murray Elevators, Murray, Utah) until experimental use. At the start of the experimental feeding schedule juveniles hatched the previous March were transferred to 450 L tanks to give a rearing density of 1 g/L. Each tank was supplied with supplemental aeration and single-pass, ambient ($10°-14°$ C.) freshwater at a flow rate of 1 to 1.5 L/min. The fish were reared under simulated natural photoperiod, provided by fluorescent lighting and a 24 h timer. After all fish were acclimated to the carnitine-free (control) diet for 2 weeks, they were fed one of 2 diets for 9 weeks: carnitine-free (control) and carnitine-supplemented, at 23 mmol (3.7 g)/kg wet weight of finished diet. Feed was dispensed at 1.5 h intervals from 0800 to 1700 hours, using automatic feeders (Model SF7, Aquatic Eco-Systems, Apopka, Fla.) to provide a daily ration at 3% of the body weight.

Isolation of liver mitochondria. Liver mitochondria were isolated from juvenile salmon according to the method described for rainbow trout by Suarez, R. K. and Hochachka, P. W., *Preparation and Properties of Rainbow Trout Liver Mitochondria*, J. Comp. Physiol, 145B:2175–279, 1981.

Isolation of hepatocytes. Hepatocytes were isolated from 2-year old salmon weighing 300 to 500 g by collagenase digestion according to the method of French, C. J.; Mommsen, T. P. and Hochachka, P. W., *Amino Acid Utilisation in Isolated Hepatocytes from Rainbow Trout*, Eur. J. Biochem., 113:311–317, 1981. Fish denied food overnight were anesthetized in MS-222 solution (0.19 mmol/L), the liver was exposed, the portal vein cannulated and the heart punctured. Refrigerated ($10°-15°$ C.) Medium A (Modified Hanks Balanced Salt Solution, Hanks, J. H. and Wallace, R. E., *Relation of Oxygen and Temperature in the Preparation of Tissues by Refrigeration*, Proc. Soc. Exp. Biol. Med., 71:196–210, 1949, from which $Ca^{2+}$ and glucose were omitted, bicarbonate was reduced to 10 mmol/L, and HEPES buffer (pH 7.4) was added at 10 mmol/L), equilibrated with $O_2:CO_2$ (99:1), was immediately pumped through the liver via the portal vein at 2 mL/(min·g) until the liver was cleared of blood. The liver was then transferred to a gauze sponge secured over a funnel and perfused for an additional 15–20 min at $10°-15°$ C. with 50 mL Medium B (Medium A supplemented with $CaCl_2$ (1 mmol/L) and collagenase (EC 3. 4. 24. 3, Sigma Product No. C 5138; 276 units/mL), recycled through the liver at 2 mL/(min·g). The perfusion medium was gassed with $O_2:CO_2$ (99:1) throughout. When the liver became soft and swollen, it was minced in Medium B, on ice, with gentle stirring to facilitate separation of hepatocytes, then filtered through gauze and the filtrate centrifuged at $4°$ C. at 100×g for 1.5 min. The pellet of hepatocytes was washed by resuspension in 40 mL Medium A made 1 mmol/L in $CaCl_2$ and centrifuged again. The hepatocytes were washed with fresh medium twice more and resuspended at a density to give 10–15 mg protein/mL. Protein content was determined by the biuret method. Viability, as assessed by exclusion of Trypan Blue, was routinely higher than 95%.

Preparation of liver cubes. Juvenile Atlantic salmon were killed by a sharp blow to the head. The liver was excised immediately and transferred to 10 mL of ice-cold Medium A, in a chilled glass petri dish set on ice. The livers from 2 to 3 fish (0.5–1 g tissue) were blotted on filter paper, weighed, then put back into the petri dish and minced with a razor blade into small cubes ($\sim 1-2$ mm$^3$). The medium was discarded by aspiration, and the cubes were washed twice more by repeated suspension in 10 mL of fresh Medium A and aspiration. Washed cubes were resuspended in 2 mL of Medium A made 1 mmol/L in $CaCl_2$.

Tissue glycogen content. After fish were killed by a blow on the head, liver and a piece of muscle adjacent to the dorsal fin were excised and stored frozen at $-70°$ C. for less than 2 weeks. Glycogen content was assayed by determining glucose released after amyloglucosidase (EC 3. 2. 1. 3) digestion of the neutralized acid-soluble fraction of a 17% homogenate in 0.6 mmol/L $HClO_4$, according to Keppler, D. and Decker, K. *Glycogen* In: Methods of Enzymatic Analysis (Bergmeyer, H. U., ed.), 3rd Edition, Vol. VI, pp. 11–18, Verlag Chemie, Deerfield Beach, Fla., 1983. Glucose was determined enzymatically by coupling of glucose oxidase with horse-radish peroxidase, using Sigma Diagnostic Kit No. 510-A. Bovine liver glycogen served as a standard for comparison, and could be fully accounted for as released glucose in the range of glycogen found in salmon liver.

Fatty acid oxidation in isolated mitochondria. Oxidation of fatty acids was assayed in 20 mL scintillation vials containing 1.9 mL of reaction mixture of the following composition: $KH_2PO_4$, 24 mmol/L; Tris buffer, 9.5 mmol/L, pH 7.4; $MgCl_2$, 5 mmol/L; $KHCO_3$, 3 mmol/L; KCl, 85 mmol/L; malic acid, 0.1 mmol/L; ATP, 1 mmol/L; [1-$^{14}$C] sodium palmitate, 0.1 mmol/L, 7.4 kBq and bovine serum albumin (fatty acid free, Sigma, A-6003), 1%. The reaction mixture (excluding ATP) was stirred overnight at $4°$ C. to allow albumin and palmitate to form a complex. The assay was initiated by addition of ATP and 0.1 mL of mitochondrial suspension (4–6 mg protein). Each vial was immediately gassed with $O_2:CO_2$ (99:1), sealed with a rubber stopper to which a plastic center well holding a piece of fluted filter paper was attached, and incubated at $15°$ C. with shaking. After 40 min, 0.3 mL of 20% KOH was injected through the stopper into the center well and the reaction terminated by injection of 0.5 mL of 1.5 mol/L HCl into the main chamber. Shaking was continued for another hour to distill [$^{14}$C]$CO_2$ into the center well. Unreacted palmitic acid precipitated with protein to form a white ring on the vial wall. The center well was transferred to another scintillation vial and rinsed with 2 mL of water. The well and the rinse were mixed with 6.5 mL of Aquasol and counted for radioactivity with a TM Analytic Model 6895 Beta Trac Liquid Scintillation System (TM Analytic, Inc., Elk Grove, Ill.). The acidified reaction mixture was centrifuged at 10,000×g for 5 min and 2 mL of resultant clear supernatant fluid was transferred to a scintillation vial and mixed with Aquasol to determine radioactivity in the acid-soluble fraction. The sum of radioactivity from $CO_2$ trapped in the center well and radioactivity in the acid-soluble fraction of the reaction mixture was used as a measure of the oxidation of palmitate.

Pyruvate carboxylase (PC) flux in isolated mitochondria. PC flux was assayed by measuring pyruvate-dependent incorporation of [$^{14}$C]$KHCO_3$ into acid-stable radiolabeled products during 15 min of incubation at $15°$ C., as described for rainbow trout by Suarez, R. K. and Hockachka, P. W., *The Pyruvate Branch Point in Fish Liver Mitochondria: Effects of Acylcarnitine Oxidation on Pyruvate Dehydrogenase and Pyruvate Carboxylase Activities*, J. Comp. Physiol., 143B:275–279, 1981. Reaction mixtures, held in 20 mL scintillation vials, were of the following composition: potassium phosphate buffer, pH 7.4, 25 mmol/L; Tris buffer, pH 7.4, 10 mmol/L; KCl, 72 mmol/L; MgCl$_2$, 5 mmol/L; sodium pyruvate, 5 mmol/L; [$^{14}$C]KHCO$_3$ (37 kBq), 12 mmol/L; mitochondria, 4-6 mg protein. Reactions were terminated by the addition of 0.5 mL of 1.5 mol/L HCl, and the acidified reaction mixtures were baked to dryness over a steam bath. The residue so obtained was extracted with 2 mL of water and the contents of the vial (extract and remaining residue) were diluted with 6.5 mL of Aquasol for determination of acid-stable radiolabeled products.

PC activity in particle-free extracts of mitochondria. Particle-free extracts were prepared by homogenizing liver mitochondria (~20 mg protein) in 1 mL of detergent solution containing: deoxycholate (0.1%), Tris buffer (0.1 mol/L, pH 7.2) and glutathione (1 mmol/L). Residual insoluble matter was removed by centrifugation at 10,000×g at 4° C. for 5 min, and the clear supernatant fluid was used as the source of PC. Protein content was determined by the biuret method. Enzymatic activity was assayed by coupling with excess malate dehydrogenase and spectrophotometric measurement of the resultant pyruvate-dependent oxidation of NADH at 339 nm during 5 min incubation at 25° C., Suarez, R. K. and Hochachka, P. W., *Pyruvate Carboxylase from Rainbow Trout Liver*, J. Comp. Physiol., 143B:281-288, 1981; Ji, H., Bradley, T. M.; and Tremblay, G. C., *Characterization and Tissue Distribution of Pyruvate Carboxylase in Atlantic Salmon (Salmo Salar)*, Comp. Biochem. Physiol., 106B:587-593, 1993. Correction for potential interference by other dehydrogenases was achieved by routinely subtracting rates observed when ATP and acetyl CoA were omitted from the reaction mixture. These rates were typically <20% of the rates observed with the complete reaction mixture.

Fatty acid oxidation in suspensions of isolated hepatocytes. Palmitate oxidation by hepatocytes was assayed in a 50 mL Erlenmeyer flask containing 8 mL Medium A, made 1 mmol/L in CaCl$_2$, 1.25% in bovine albumin and 0.31 mmol/L in [1-$^{14}$C] sodium palmitate (9.25 kBq). This reaction mixture was stirred overnight at 4° C. to allow the formation of albumin-palmitate complex. The assay was started by addition of 2 mL of hepatocyte suspension (20-30 mg protein). The flask was sealed and gassed in the same way as described for the assay of palmitate oxidation by mitochondria (see above). After 1 h incubation at 17° C. with shaking, 0.3 mL of 20% KOH was injected into the center well followed by of 0.67 mL of 6 mol/L HClO$_4$ injected into the main chamber. The center well and the acidified reaction mixture were treated the same way as in the mitochondrial assay of palmitate oxidation (see above). The sum of the radioactivity in the center well and the acid-soluble fraction of the reaction mixture was taken as a measure of palmitate oxidation.

Gluconeogenesis in isolated hepatocytes. Lactate-dependent gluconeogenesis was assayed by measuring the incorporation of radiolabelled lactate into glucose according to Mommsen, T. P.; Walsh, P. J. and Moon, T. W., *Gluconeogenesis in Hepatocytes and Kidney of Atlantic Salmon*, Mol. Physiol., 8:89-100, 1985 and Walton, M. J. and Cowey, C. B., *Gluconeogenesis by Isolated Hepatocytes from Rainbow Trout Salmo Gairdneri*, Comp. Biochem. Physiol., 62B:75-79, 1979. The assay was initiated by mixing 2 mL of hepatocyte suspension (20-30 mg protein) with 8 mL of Medium A made 1 mmol/L in CaCl$_2$, 1.25% in bovine albumin and 12.5 mmol/L in [1-$^{14}$C] lithium lactate (74 kBq). Each flask was sealed with a rubber stopper, gassed with O$_2$:CO$_2$ (99:1) and incubated at 17° C.

At 1 h and 2 h of incubation, an aliquot of 1 mL of reaction mixture, including hepatocytes, was withdrawn and mixed with 0.2 mL of 1.8 mol/L trichloroacetic acid (TCA). Precipitated protein was removed by centrifugation at 10,000×g for 5 min, 1 mL of the supernatant fluid was neutralized with 43.8 μL of 6 mol/L K$_2$CO$_3$. An aliquot (1 mL) of neutralized extract was mixed with 4 mL of 1 mol/L glucose and 3 g of Amberlite MB-3 resin and shaken for 1 h to extract unreacted lactate. The resin was removed by centrifugation and the difference in the amount of radioactivity remaining in the supernatant fluid between 1 and 2 h of incubation was used as a measure of the rate of lactate-dependent gluconeogenesis.

Assays with liver cubes. Palmitate oxidation was measured in suspensions of liver cubes (0.5-1 g tissue in 2 mL) under the same conditions described for the corresponding measurement with isolated hepatocytes (see above) except that the reaction mixtures were homogenized after acidification. For gluconeogenesis, 1 mL of the reaction medium was withdrawn (avoiding cubes) after 1 h and 2 h incubation to isolate radiolabeled extracellular glucose.

Statistical analysis. Statistical analysis was accomplished with the StatMost computer program from DataMost Corp., Salt Lake City, Utah. Statistical significance of differences was determined by the Student t-test.

EXAMPLE I

The composition of the carnitine-free (control) diet is shown in Table 2. Protein, carbohydrate, and fat constituted 505, 242 and 91 g/kg, respectively, of the weight of dry ingredients plus oil, or 370, 178 and 67 g per kg, respectively, of the wet weight of the finished diet. Where indicated, L-carnitine replaced an equal weight of sucrose during preparation of the carnitine-supplemented diets, in amounts up to 3.7 g or 23 mmol carnitine/kg wet weight of finished diet. Since carnitine replaced an equal weight of sucrose, the carnitine-supplemented diets had a slightly lower (≦0.5%) caloric content.

TABLE 2

Composition of diet[1]

| Ingredients | Amount in Defined Control Diet (g) |
|---|---|
| Casein | 296 |
| Gelatin | 74.1 |
| Dextrin | 88.9 |
| Sucrose | 88.9 |
| Mineral mix[2] | 29.6 |
| Vitamin mix[3] | 29.6 |
| α-cellulose | 59.3 |
| Fortified oil[4] | 66.7 |
| Choline-Vitamin B-12 solution[5] | 7.4 |
| Water | 259 |

[1]Where indicated in the text, carnitine was added in place of an equal weight of sucrose.
[2]Each kg of mineral mix contained: AlCl$_3$, 0.15 g; ZnCO$_3$, 3.75 g; CuSO$_4$.5H$_2$O, 0.75 g; KI, 0.15 g; MgSO$_4$.H$_2$O, 4.0 g; CoCl$_2$.6H$_2$O, 0.35 g; Na$_2$MoO$_4$2H$_2$O, 0.2 g; Na$_2$SeO$_3$, 0.075 g; U.S.P. XIII No. 2 salt mixture, 990.575 g.
[3]Each kg of vitamin mix contained: thiamine.HCl, 1.25 g; riboflavin, 1.25 g; pyridoxine, 0.63 g; niacinamide, 7.5 g; D-calcium pantothenate, 6.25 g; inositol, 25 g; biotin, 0.13 g; folic acid, 0.38 g; ascorbic acid, 25 g; alphacel (non-nutritive bulk), 932.61 g.
[4]Each kg of fortified oil contained: retinyl palmitate, 0.111 g; cholecalciferol, 0.065 g; DL-α-tocopherol acetate, 6.67 g in 3.5 ml ethanol; menadione, 0.276 g, ethoxyquin (antioxidant), 1.663 g; menhaden oil, 988.453 g.
[5]Choline chloride, 300 g and vitamin B-12, 0.030 g in 1 L of aqueous solution.

The carnitine content of the diets was confirmed by analysis. The carnitine-free defined diet contained no detectable carnitine upon assay (<0.01 mmol/kg wet wt). In the description which follows, the indicated carnitine content refers to the amount of carnitine contained in 1 kg wet wt of finished diet.

It is postulated that, through its catalytic role in β-oxidation, carnitine might stimulate flux through pyruvate carboxylase (PC). Fixation of $CO_2$ by PC generates oxaloacetate, which can replenish intermediates of the tricarboxylic acid cycle drawn off for biosynthetic purposes. Tests of this working hypothesis were begun by determining whether fatty acid oxidation in salmon mitochondria is indeed carnitine-dependent, and whether liver cells from carnitine-fed salmon exhibit greater rates of lactate-dependent gluconeogenesis, which is limited by PC.

Figure 3:
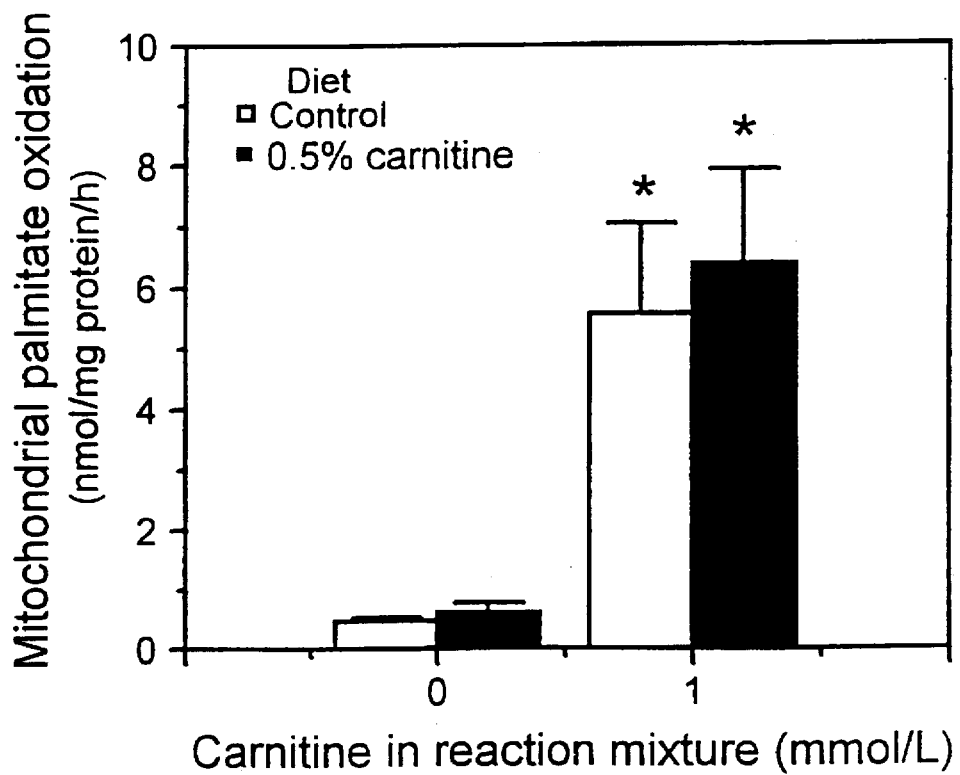
FIG. 3 is a bar graph of the stimulatory effect of carnitine added to reaction mixtures for assay of fatty acid (palmitate) oxidation in isolated liver mitochondria from juvenile salmon (parr) fed defined diets for 9 weeks.

Mitochondria isolated from the liver of juvenile Atlantic salmon oxidized palmitate at a 10-fold greater rate when carnitine was added to the reaction mixture, whether the mitochondria were isolated from carnitine-fed or carnitine-deprived fish (FIG. 3). Furthermore, in the absence of added carnitine, hepatocytes isolated from carnitine-fed fish oxidized palmitate at 2.5× the rate observed with cells from carnitine-deprived fish (Table 3). Liver cubes from juvenile salmon fed carnitine also oxidized palmitate at a greater rate than cubes from carnitine-deprived juveniles.

TABLE 3

Effect of dietary carnitine on palmitate oxidation in isolated hepatocytes from 2-yr old salmon and liver cubes of juvenile salmon fed carnitine-free or carnitine supplemented diets for 9 weeks[1,2]

| Dietary carnitine (mmol/kg diet) | Liver cubes (mmol/(g · h)) | Isolated hepatocytes (nmol/(mg protein · h)) |
|---|---|---|
| 0 (Control) | 8.96 ± 1.41 | 0.43 ± 0.26 |
| 23 | 13.24 ± 0.45* | 1.08 ± 0.15* |

[1]Palmitate oxidation was measured as generation of radiolabeled $CO_2$ and acid-soluble products from [1-$^{14}$C] palmitate as described in Materials and Methods.
[2]Values are means ± SD (n = 4 for liver cubes and n = 3 for hepatocytes).
*Significantly different (P < 0.05) from values obtained with control diet.

The data in Table 3 (and FIG. 3) clearly show that, in salmon, L-carnitine promotes fat oxidation.

EXAMPLE III

Figure 4:
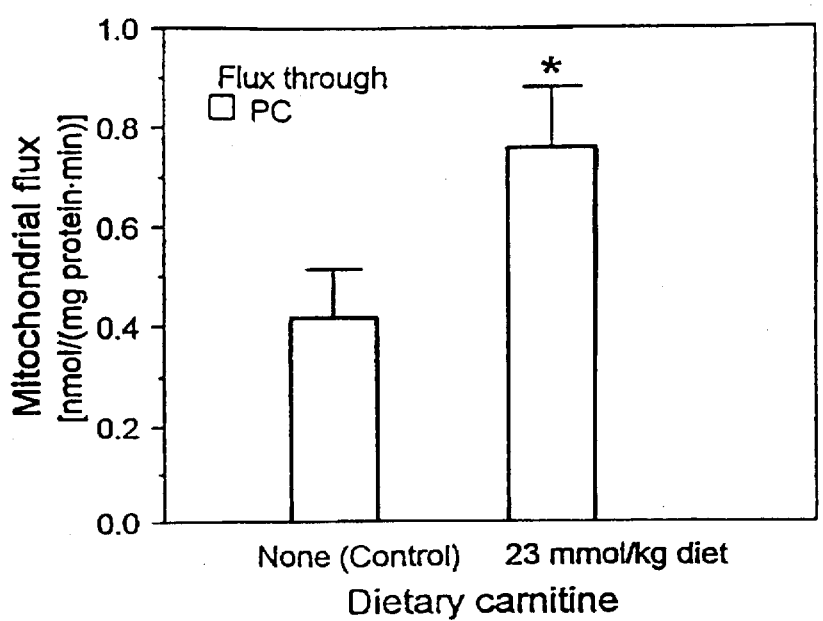
FIG. 4 is a bar graph of the effect of dietary carnitine on flux through pyruvate carboxylase (PC) in isolated mitochondria from juvenile salmon (parr) fed defined diets for 9 weeks. PC flux was assayed by measuring pyruvate-dependent incorporation of $[^{14}C]KHCO_3$ into acid-stable products.
Figure 5:
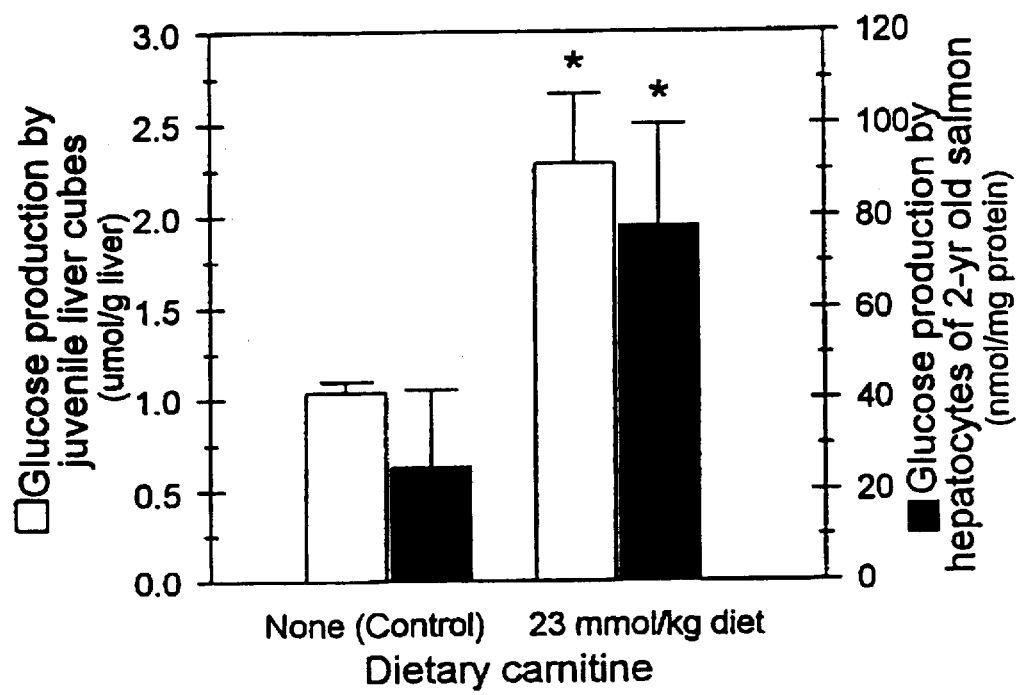
FIG. 5 is a bar graph of the effect of dietary carnitine on gluconeogenesis in isolated hepatocytes of two year old salmon and liver cubes of juvenile salmon (parr). Fish were fed carnitine-free and carnitine supplemented diets for 9 weeks. Gluconeogenesis was assayed by measuring incorporation of radiolabeled lactate into glucose between 1 and 2 h of incubation at 17° C. Values are means ±SD; n=4 for assays with liver cubes and n=3 for assays with hepatocytes.

Evidence was sought to determine whether changes in flux through PC did, in fact, take place with carnitine intake. Flux measurements with suspensions of mitochondria isolated from the livers of carnitine-fed juvenile Atlantic salmon revealed an 81% greater rate of PC flux (FIG. 4). Whether the increase in PC flux was sufficient to alter cell metabolism was tested by measuring lactate-dependent gluconeogenesis in suspensions of hepatocytes and liver cubes. The rate of lactate-dependent gluconeogenesis in surviving liver cubes from juvenile salmon and isolated hepatocytes from 2-year old salmon was 2.2× and 3.1×greater, respectively, with liver from carnitine-fed fish (FIG. 5). Carnitine-fed juvenile salmon also exhibited a 5.4× increase in muscle glycogen, but little change in liver glycogen, consistent with the primary function of gluconeogenesis to maintain extrahepatic glycogen in carnivores (Table 4). These observations indicate that the increase in PC flux observed with isolated mitochondria alters intermediary metabolism in the organism. They also support the hypothesis that other metabolic changes observed in response to increased dietary carnitine are coupled to a rise in PC flux.

TABLE 4

Effect of dietary carnitine on tissue concentration of glycogen in juvenile salmon fed carnitine-free or carnitine supplemented diets for 9 weeks[1,2]

| Dietary carnitine (mmol/kg wet wt of diet) | Liver glycogen (mg glycogen/g liver) | Muscle glycogen (mg glycogen/g muscle) |
|---|---|---|
| 0 (Control) | 118.3 ± 20.1 | 1.25 ± 0.99 |
| 23 | 145.2 ± 35.1 | 6.72 ± 2.25* |

[1]Glycogen was assayed as glucose released from amyloglucosidase digestion as described in Materials and Methods.
[2]Values are means ± SD (n = 6).
*Significantly different (P < 0.001) from values obtained with fish fed the control diet.

EXAMPLE IV

Figure 6:
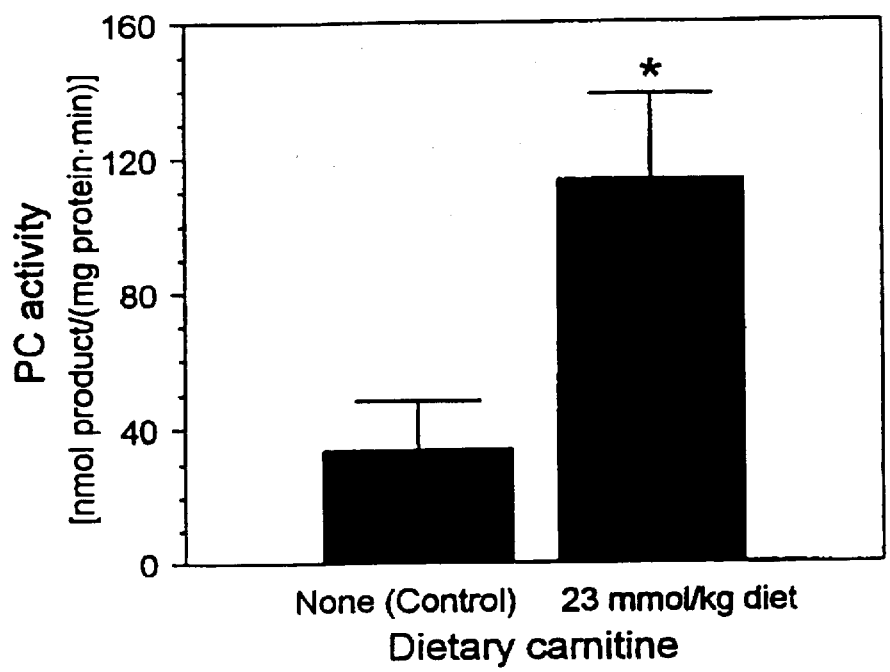
FIG. 6 is a bar graph of the effect of dietary carnitine on PC activity in particle-free extracts of liver mitochondria from juvenile salmon (parr) fed carnitine-free and carnitine supplemented diets for 9 weeks. PC was assayed by coupling with malic dehydrogenase and measuring the resultant pyruvate-dependent oxidation of NADH as the decrease in absorbance at 339 nm. Values are means ±SD (n=6).

PC activity in particle-free extracts was assayed to determine whether liver from carnitine-fed fish contained more enzyme. Results show the amount of PC to be 3.3× greater in mitochondria from carnitine-fed salmon (FIG. 6).

Since the reduced energy reserve in salmon undergoing smoltification may contribute to mortality or stunted growth upon transfer to seawater, improvement in energy reserved through the addition of carnitine to the feed would be expected to reduce mortality and/or improve growth. With the onset of smoltification, the juvenile salmon will be fed a commercial feed (for example, Nelsons Sterling Silvercup, Murray Elevators, Murray, Utah) supplemented with carnitine to satiation daily. The amount of carnitine to be added to the feed will vary between 0.01 to 0.5% of the wet weight of the juvenile diet. The feed preferably will be distributed in the form of pellets.

The beneficial effect of the L-carnitine may be achieved by administering the L-carnitine as an additive to the feed or by any other means known in the art. Assuming daily feed consumption at 3% of body weight, generally from an average 3 to 150 mg of carnitine per kg body weight of fish would be fed per day, preferably, from 10 to 120 mg/day. The feeding of the carnitine may be from January (peak PC) to July (about two months after transfer to seawater, though beneficial effects may be achieved by feeding for more limited periods, e.g. during 3 weeks around peak smoltification).

All references set forth herein are incorporated by reference into this disclosure in their entirety.

The foregoing description has been limited to a specific embodiment of the invention. It will be apparent, however, that variations and modifications can be made to the invention, with the attainment of some or all of the advantages of the invention. Therefore, it is the object of the appended claims to cover all such variations and modifications as come within the true spirit and scope of the invention.

Having described our invention, what we now claim is:

1. A fish feed composition comprising juvenile salmon feed to reduce mortality and/or improve growth in juvenile salmon upon transfer to seawater, which feed comprises an amount of L-carnitine in admixture with juvenile salmon feed compositions sufficient to improve gluconeogenesis and/or glycogen reserves during smoltification and adaptation to seawater.

2. The composition of claim 1 wherein the L-carnitine is present in an amount of between about 0.01 to 0.5% by weight based on the total wet weight of the finished salmon feed.

3. The composition of claim 1 wherein the juvenile salmon are selected from the group consisting of parr and smolts.

4. The composition of claim 3 wherein the juvenile salmon are parr.

5. The composition of claim 3 wherein the juvenile salmon are smolts.

6. A fish feed composition for reducing the mortality and/or improving the growth of juvenile salmon upon transfer to seawater which comprises:

a juvenile salmon feed composition containing from 0.01 to 0.5% by weight of L-carnitine based on the total wet weight of finished salmon feed to improve gluconeogenesis and/or glycogen reserved during smoltification and adaptation to seawater.

7. A method of reducing the mortality and/or improving the growth of juvenile salmon upon transfer to sea water which comprises supplementing the feed to said juvenile salmon with an average of from 3 to 150 mg per day of L-carnitine for each kilogram of body weight of said juvenile salmon.

8. The method of claim 7 wherein the feed of said juvenile salmon is supplemented at least during the period of peak smoltification.

9. The method of claim 8 wherein the feed of said juvenile salmon is supplemented for at least three weeks.

10. The method of claim 7 wherein the feed of said juvenile salmon is supplemented during the period from peak pyruvate carboxylase activity to two months after transfer to sea water.

11. The method of claim 7 wherein the L-carnitine is added to the feed of the juvenile salmon.

12. The method of claim 11 wherein from 0.01 to 0.5% by weight of L-carnitine is added to said feed based on the total wet weight of the finished feed.

13. The method of claim 7 wherein the juvenile salmon are selected from the group consisting of parr and smolts.

14. The method of claim 13 wherein the juvenile salmon are parr.

15. The method of claim 13 wherein the juvenile salmon are smolts.

* * * * *